United States Patent [19]
Cherri

[11] Patent Number: 5,550,585
[45] Date of Patent: Aug. 27, 1996

[54] VIDEO INTER-VIEW SYSTEM

[75] Inventor: Allan Cherri, No. 305, 3630 Andrews Dr., Pleasanton, Calif. 94588

[73] Assignee: Allan Cherri, Pleasanton, Calif.

[21] Appl. No.: 38,618

[22] Filed: Mar. 26, 1993

[51] Int. Cl.$^6$ .......................... H04N 5/225; G06F 15/20
[52] U.S. Cl. .................. 348/207; 348/294; 348/564; 348/597; 395/129
[58] Field of Search .................................. 348/207, 584, 348/586, 595, 597, 564, 294; 395/129, 135; 345/115; H04N 5/225

[56] References Cited

U.S. PATENT DOCUMENTS

| | | | |
|---|---|---|---|
| 4,398,799 | 8/1983 | Swift | 350/174 |
| 4,496,981 | 1/1985 | Ota | 348/294 |
| 4,602,286 | 7/1986 | Kellar et al. | 348/597 |
| 4,807,202 | 2/1989 | Cherri et al. | 367/129 |
| 5,035,474 | 7/1991 | Moss et al. | 350/3.7 |
| 5,099,331 | 3/1992 | Truong | 348/564 |
| 5,130,794 | 7/1992 | Ritchey | 348/39 |
| 5,151,722 | 9/1992 | Massof et al. | 351/158 |
| 5,162,828 | 11/1992 | Furness et al. | 353/122 |
| 5,281,960 | 1/1994 | Dwyer, III | 345/31 |
| 5,394,517 | 2/1995 | Kalawsky | 395/129 |
| 5,402,147 | 3/1995 | Chen et al. | 345/115 |

OTHER PUBLICATIONS

EDS Technical Journal, vol. 6, No. 1, 1992 (est. published Apr. 1, 1992) pp. 8–15 Title: Virtual Reality/Total Environment . . . Author: Allan Cherri (inventor in this case).

VR News, vol. 1, Issue 7, Aug./Sep. 1992, pp. 12–13 Title: The British Aerospace Rave development Inventor: Roy Kalawsky.

*Primary Examiner*—Wendy Garber
*Assistant Examiner*—Andrew B. Christensen
*Attorney, Agent, or Firm*—Claude A. S. Hamrick; Emil C. Chang

[57] ABSTRACT

A video module including a video sensor having a sensor video signal output terminal, a timing signal terminal, and an image field of pixel elements responsive to incident light to generate sensor video signals; a processor having a sensor video signal input terminal coupled to the output terminal, a host signal input terminal for accepting a host signal, a timing signal terminal, video pixel signal combining means responsive to the sensor video signal and the host signals simultaneously to develop display video signals where each of the pixel elements is individually manipulated and controlled, and a display video signal output terminal for outputting the display video signals; a video display having a thin screen disposed along an axis passing through the center of and perpendicular to the image field and facing oppositely from the image field, a display video signal input terminal, and a timing signal terminal, wherein the video signals generate video images on the screen; and a timer for providing timing signals.

14 Claims, 6 Drawing Sheets

VIDEO INTER-VIEW SYSTEM

BACKGROUND OF THE INVENTION

1. Technical Field

The present, invention relates to video technology and more specifically to technologies of combining images in virtual reality (VR) settings.

2. Discussion of Prior Art

Visual environment simulation computers develop graphical data into images which can be displayed as views of virtual reality environments. VR capabilities may be useful in various real world situations. Ordinary visible objects and surroundings can, through the: intermediary of head-up displays, become subjects of reconceptualizations in virtual worlds created by computers.

It has not always been feasible to superpose VR images on physical world settings. Typically, in order not to obscure physical environments, they are viewed through semi-transparent or beam-splitter visors, combining simulation images for display.

U.S. Pat. No. 4,398,799 by Swift discloses a head-up display in which a cathode ray tube (CRT) projects video images onto a stationary semi-reflecting visor, combined with the physical world view, into the eyes of a user. Reflected images intersect a head.-mounted second semi-reflector and are reflected into a video camera mounted on the user's head, but the camera is not needed for the composite view to be seen by the user.

U.S. Pat. No. 5,151,722 by Massof et al. discloses a video display which is held in a user's line-of-sight. A head-side mounted video source projects images through folding optics into the line-of-sight of the user. The video source can include a video camera which is offset and incurs parallax error.

Combining images by overlaying simulation video pixels on semi-reflective visors compromises the light from both real world and simulation sources, which interferes with presenting either of them completely. Physical environment light penetrating visors is not completely blocked by simulation video pixels.

U.S. Pat. No. 5,035,474 by Moss et al. criticizes semi-transparent visors for reducing the light available from physical world sources. A visor's positions on a user's head are tracked and replicated by an infra-red camera which is offset mounted and incurs parallax error. The user has restricted mobility.

Physical and virtual environment views must be from identical points of view in order to be correlated without incurring parallax error. A visor mounted on a user's head where its position is tracked and replicated by a servo mechanism should, ideally, be on-axis, but should not obscure the user's view of the physical world. Preserving physical environment views conflicts with both goals of complete control by simulation video pixels and also with aligning a (non-semireflective) servo co-axially with the user's line-of-sight to avoid parallax error. Yet both of these goals are important for precise interaction between simulated and physical environments.

In other prior art, U.S. Pat. No. 4,496,981 by Ota economizes materials and processing through consolidating video camera sensor and display cell functions, as shown by FIG. 1.

SUMMARY OF THE INVENTION

It is an objective of the present invention to facilitate a user's viewing of his physical environment interchangeably with viewing of a virtual environment.

It is an additional objective to combine physical and virtual environment views and to display them.

It is another objective to facilitate controlling pixels being displayed, for better inter-relating virtual environments and physical environments.

It is another objective to provide image sensor video signals representing a user's precise perspective of his physical environment.

It is yet another objective to facilitate collecting physical environment information and delivering it to an external host.

It is a further objective to satisfy the above objectives in virtual reality applications.

It is yet a further objective to provide means for 3-D viewing of a simulated environment through using a pair of the invented modules for binocular effects.

A preferred embodiment of a viewer module according to the invention includes a video sensor, in which an image pixel field is responsive to incident light to produce sensor video signals. The field at its center has a perpendicular optical axis. The sensor means has an image sensor video signal output terminal and a timing signal terminal. An intervening processor has a sensor signal input terminal, a host signal input terminal, a display signal output terminal and a timing signal terminal. The processor is responsive to input sensor and host signals to output display signals. A video display has a thin screen oriented on the optical axis and facing away from the sensor, a display signal input terminal and a timing signal terminal, and is responsive to input display signals to display video images. A timer provides timing signals to coordinate operations of the sensor, processor and display.

The invention allows the physical environment view to be blocked by an optical-electrical-optical transducer, but (ironically) this provides coincidence between real and virtual world perspectives.

Among the advantages of the invention is its ability to display real and simulated world views from the same perspective. The module facilitates use in pairs for stereoscopic gathering and/or delivering of three dimensional views of real and simulated environments.

These and other advantages of the invention will become apparent to those skilled in the art upon reading the following Detailed Description of the preferred embodiments as shown in the Drawing figures.

DETAILED DESCRIPTION OF THE INVENTION

Figure 1:
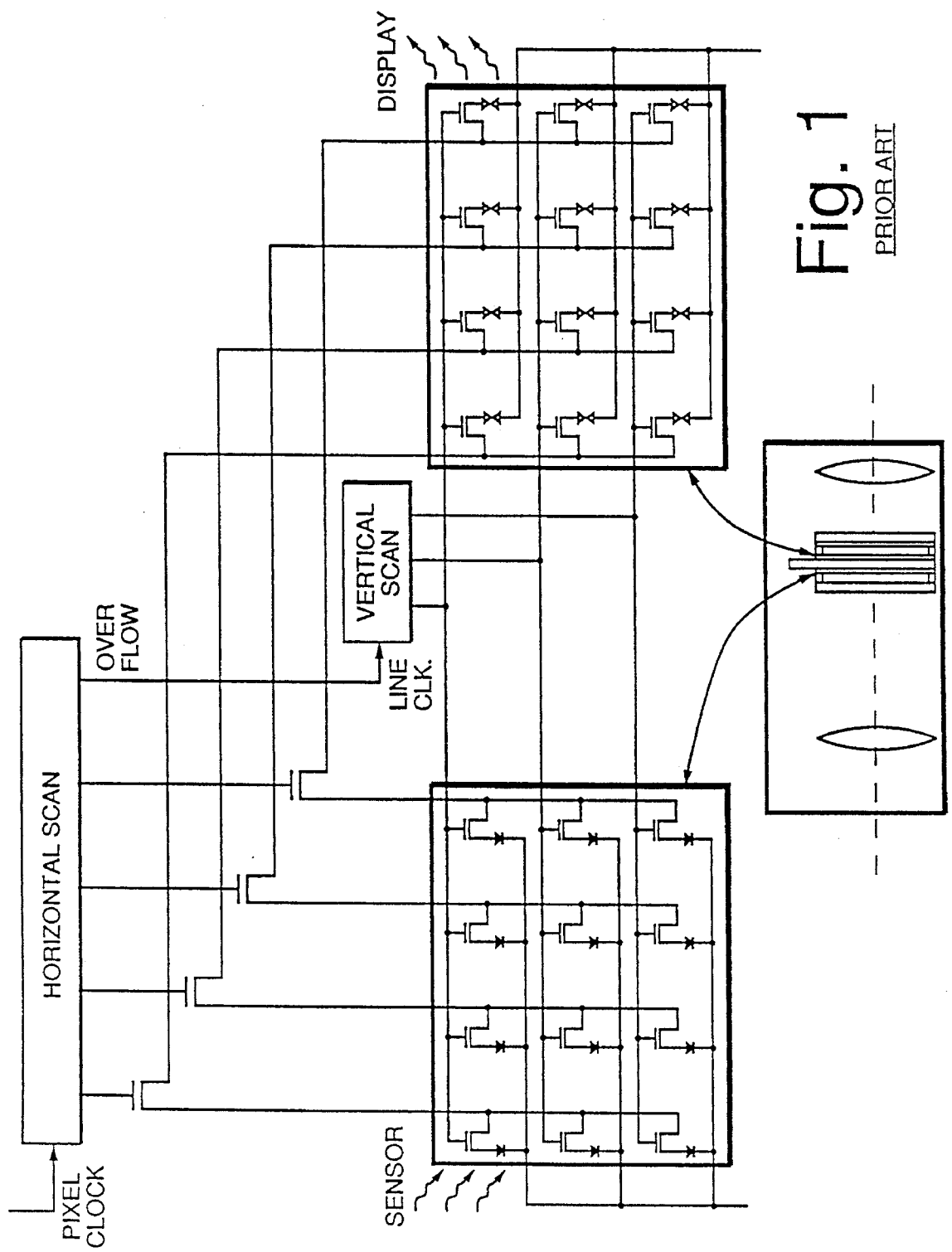
FIG. 1 is an optical and electrical schematic diagram representing a video sensor and display based on prior art.
Figure 2:
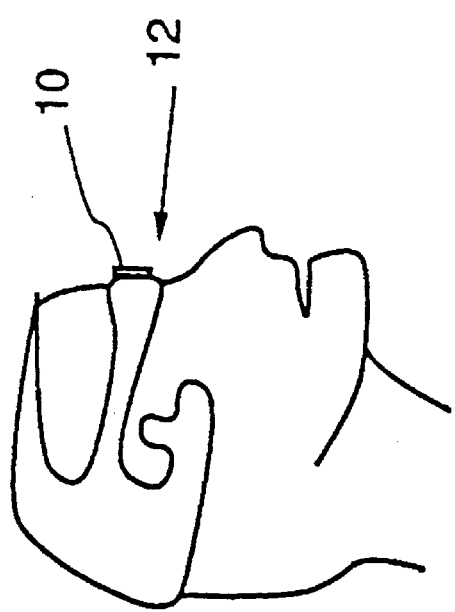
FIG. 2 illustrates a module according to the invention embodied as a viewer.

Referring to the Drawing, FIG. 2 shows the invention embodied as a module 10 in a viewer 12 which is carried on a user's head, and preferably used in conjunction with an external host system (not shown in the Figure). This Description refers to an individual module, but preferably, for binocular vision, modules 10 are used in a pair. The invention, for clarity's sake, is first disclosed in terms of pixels represented by a single bit, but in practice pixels are represented by bytes representing a range of grey level or color values.

Figure 3:
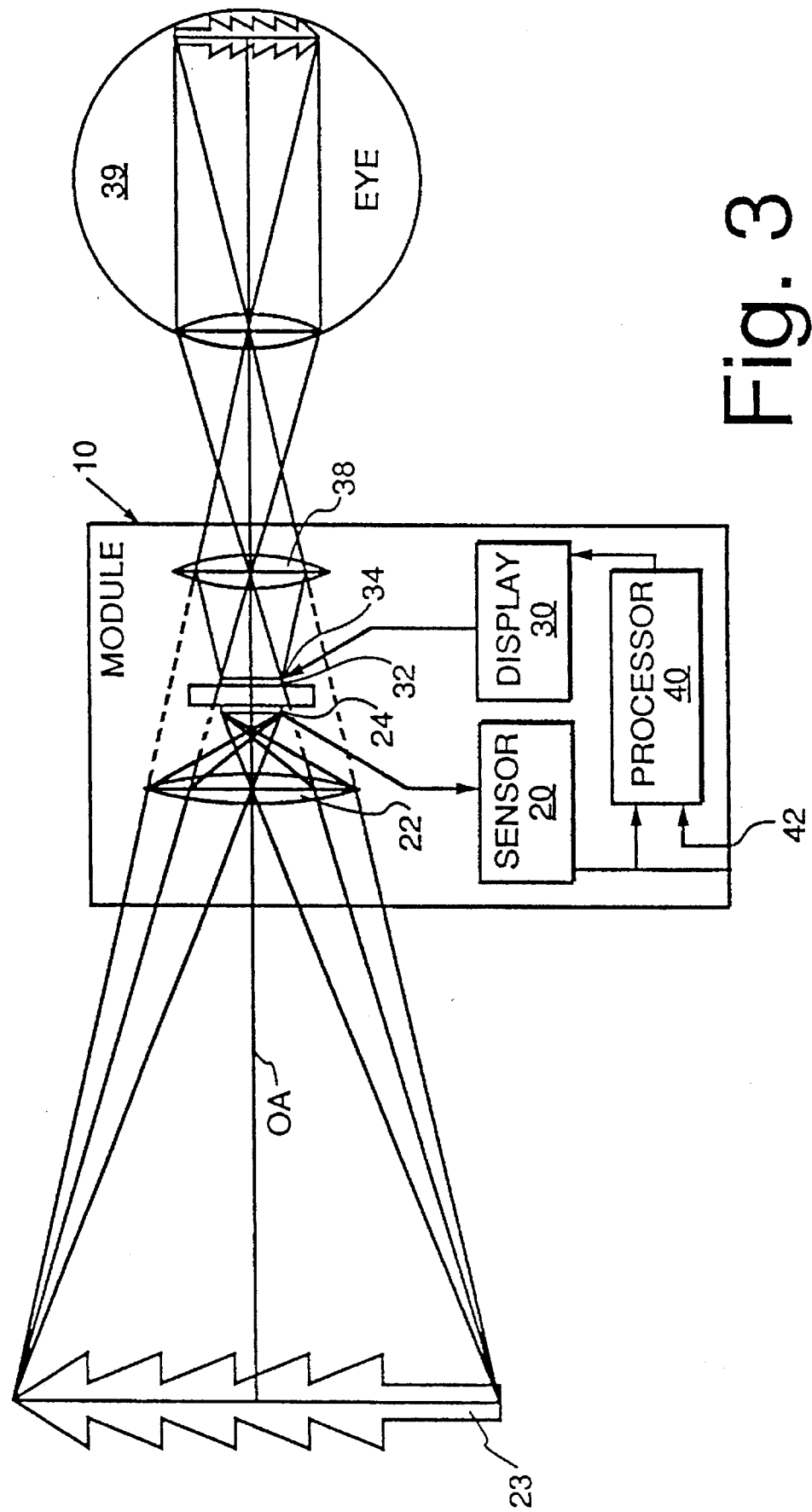
FIG. 3 shows a cross-section (not drawn to scale) of sensor and display means positioned on-axis, and shows a schematic of sensor, processor and display circuits according to the invention.

FIG. 3 shows module 10 in cross-section with a schematic diagram of the video sensor means 20, video display means 30 and intervening processor means 40. Physical environment images in optical form are transduced by the module 10 into electronic form and back into optical form. Module 10 enables an external host 100 to control values of pixels $Px_dy_d$ displayed on a screen 32. Images, while in electronic form, can be processed by the processor means 40. From the display 30 images are focussed to reconstruct light rays along the paths they would trace if not for the module 10 being in the way.

The sensor 20 includes focussing means 22, which is preferably an adjustable lens, for focussing object 23 image light onto an image sensor plane 24 containing a field of picture element or pixel. sensors (not shown). Other focussing methods including pinhole focussing are also possible. Image plane 24 at its center has a perpendicular optical axis OA. The sensor field area is for example 1" by 1" and its resolution is high ($\geq 1000$ pixels by 1000 lines). Sensor means 20 uses a light sensitive storage medium whereby light is converted into analog electrical signals which are then converted into digital electronic sensor output signals. The sensor 20 is preferably a charge coupled device (CCD).

The processor 40 has an input terminal 42 for receiving host signals including control signals and simulation video signals. Received sensor signals are processed by the processor 40 in providing display signals to the display 30. Real world 23 images which the sensor focussing means 22 has inverted at the sensor plane 241 are electronically uninverted by the processor 40 to be displayed on screen 32.

The video display 30 comprises a thin screen 32 which has an area of for example 1" by 1", and has a high (e.g., 1000 pixels by 1000 lines) resolution. Screen 32 may be a liquid crystal display (LCD), thin film transistor (TFT), plasma discharge or suitable other device. The screen 32 pixel field (not shown) is in a display plane 34 centered on axis OA parallel to, and facing away from, the sensor plane 24. The sensor 20 and display 30 scan lines are parallel. Display 30 has a controller/driver 36 (FIG. 4) as is known in the art. Displayed images are focussed through appropriate focussing (lens) means 38 into the eye 39 of a user.

The sensor 20, display 30 and processor 40 functions are synchronized by timing signals provided from a timer 15 which is coordinated, either asynchronously or synchronously, with activities in an external host 100. The module 10 and host 100 can use independent clocks and communicate asynchronously, in which case module 10 provides sensor 20 output signals asynchronously as required by host 100. The module timer 15 frequency depends upon the implementation technology.

A master clock would be required for synchronous operation of a module 10 and host 100. A master clock signal may be derived from the module timer 15 or from an external host 100. A sourced host timing signal may be adjusted to frequencies suitable for functions of the module.

The term host connotes a powerful computer residing apart from module 10. However, one can imagine a host computer small enough to be included in module 10. Output means would remain part of the module, as communications would still be desired with external VR systems. Wireless input/output means could be advantageous. Module 10 is embodied preferably in integrated circuits assembled in a compact viewer.

Figure 4:
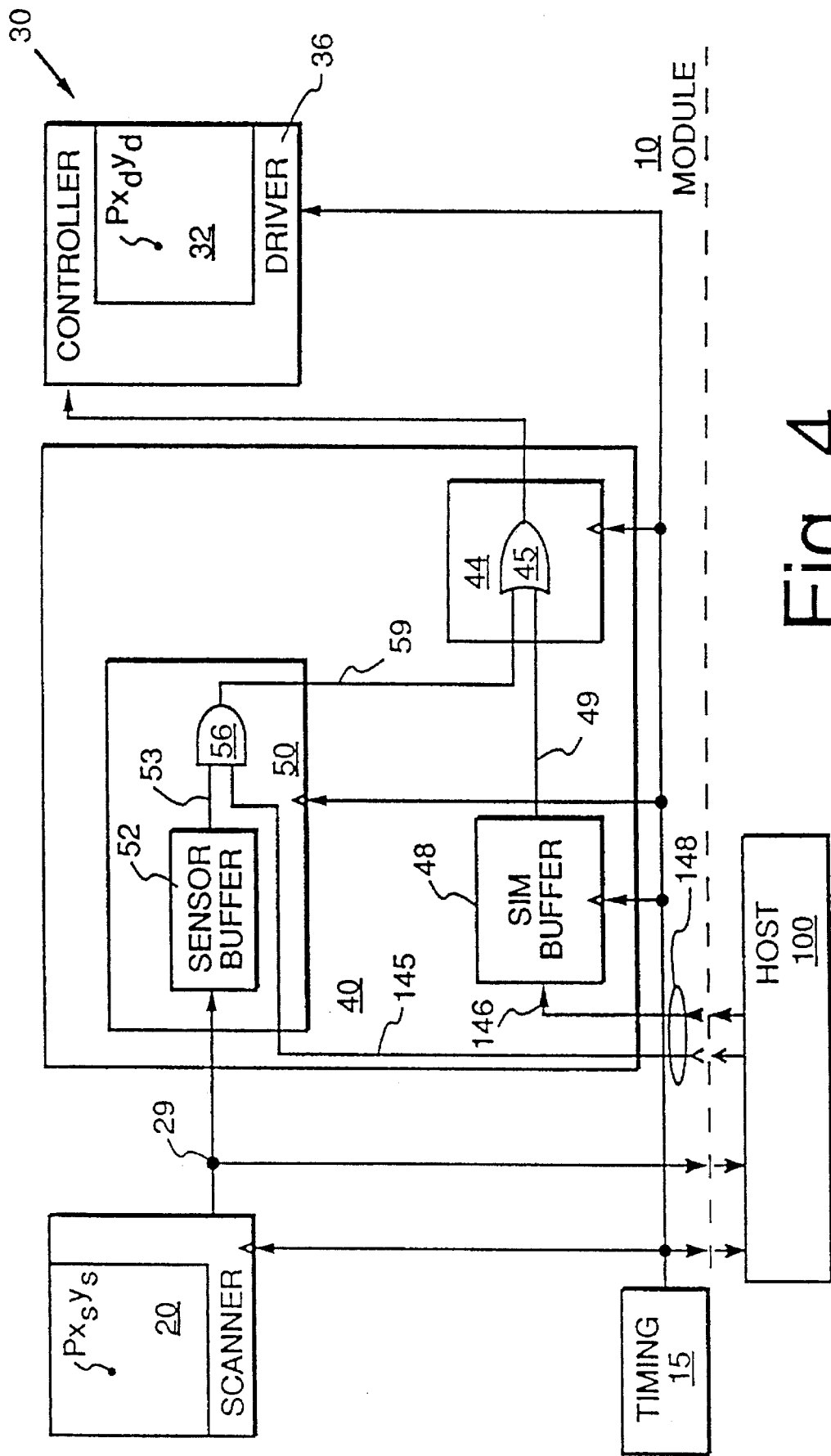
FIG. 4 is a diagram of an embodiment wherein the processor means includes physical image control, simulation video signal buffer and summation circuit means.

Referring to FIG. 4, processor 40 includes a summation circuit 44, a simulation video signal buffer 48 and a physical image controller (PIC) 50. The PIC 50 has a sensor signal buffer (a register or other type of memory) 52 which holds a pixel-value, and preferably holds a succession of pixel values. Sensor signal pixels are loaded successively and shift across the buffer 52 to an output line 53. The physical image control 50, in this embodiment, includes an AND gate 56 which receives sensor signals as well as control signals from a host 100. Line 145 sensor control signals can attenuate or pass sensor 20 video signals to display 30.

The physical image control output signal on line 59, along with the simulation buffer signal on line 49, is applied to the summation circuit 44 which in this single-bit pixel example can be an OR gate 45.

Module 10 operates preferably in a selected one of four modes. In a first or sensor-ON mode, the physical environment is represented by sensor 20 video signals exclusively, without processing, while simulation video signals on line 148 are suppressed. This may be thought of as an "electronic see-through" mode.

In a second or sensor-OFF mode, a user can see simulation video signals exclusively, while sensor video signals are suppressed, for operation as immersive VR.

In a third or sensor-enhanced mode, sensor 20 signals are processed, for example by being detoured through a host means 100, processed, and returned on line 148 as simulation signals.

In a fourth mode, sensor and simulation source video signals are combined. For example, the two source video pixel signals can be combined, as functions of their locations, with either in one of a background area or in an insert ("window") area. That is, either sensor 20 or line 148 simulation video signals are displayed in one of the areas while the other video signals are displayed in the other area. If the areas are exclusive then insert images are blanking. Or, in a second combination, sensor pixels and simulation video pixels can overlap. If the areas are non-exclusive then insert images are transparent. In a fourth mode of combining, off-board host accessories can further analyze sensor video signals, and perform pattern recognition, artificial intelligence or other functions to develop simulation video signals.

Referring to FIG. 4, the lifetime of an example pixel is traced from its origin to its destination. There can be one or multiple origins for a pixel, which can travel different routes to arrive at the display as pixel $Px_dy_d$ in column X and row Y.

Single Origin

On the imaging sensor 20 at column Xs and row Ys, a pixel $Px_sy_s$ intensity value is detected, converted into a digital value, output at the sensor signal terminal 29, and can follow several routes.

In the first mode (the Sensor-ON mode), the sensor pixel $Px_sy_s$ signal is mapped directly to the display pixel $Px_dy_d$.

In the second mode (the Sensor-OFF mode), a display pixel has an external origin. While sensor 20 pixel $Px_sy_s$ signals are blocked from display 30, another source, such as the host 100, generates a pixel $Px_d y_d$ signal value which may be un-related to the location where sensor pixel $Px_s y_s$ would appear on display 30.

In the third mode (the sensor-enhanced mode), sensor signals of physical images are processed. The sensor $Px_s y_s$ signal value is inspected or processed, for example by a host 100, either passively (without the processor interfering in sensor signals being sent to the display), or actively (with the processor manipulating signals displayed as pixel $Px_d y_d$). The inspection can be simple where the processor notes the pixel value, or complex in the context of the pixel's neighbors. Pattern recognition and other artificial intelligence techniques can further be useful in applications for the processor to recognize a physical environment and objects that may be in it.

Thus processing, for example by an external host 100, can substitute an enhanced "$Px_s y_s$" for use as display signal pixel $Px_d y_d$.

Multiple Origins

In the fourth mode (the external processing mode), the pixel $Px_s y_s$ is attenuated or passed to be used in the generation of display pixel $Px_d y_d$. The host 100 can send sensor control signals on line 145 which defines whether the sensor signal is to be blocked by AND gate 56, and simulation video signals on line 146, which are sent to summation circuit 44 to provide the values of $Px_d y_d$ to display.

This example one-pixel process is similar for all of the pixels in the image area.

Module 10 provides means for viewing physical and virtual world images together without parallax error, since the perspective is correct. Such control is not known in prior art systems.

Figure 5:
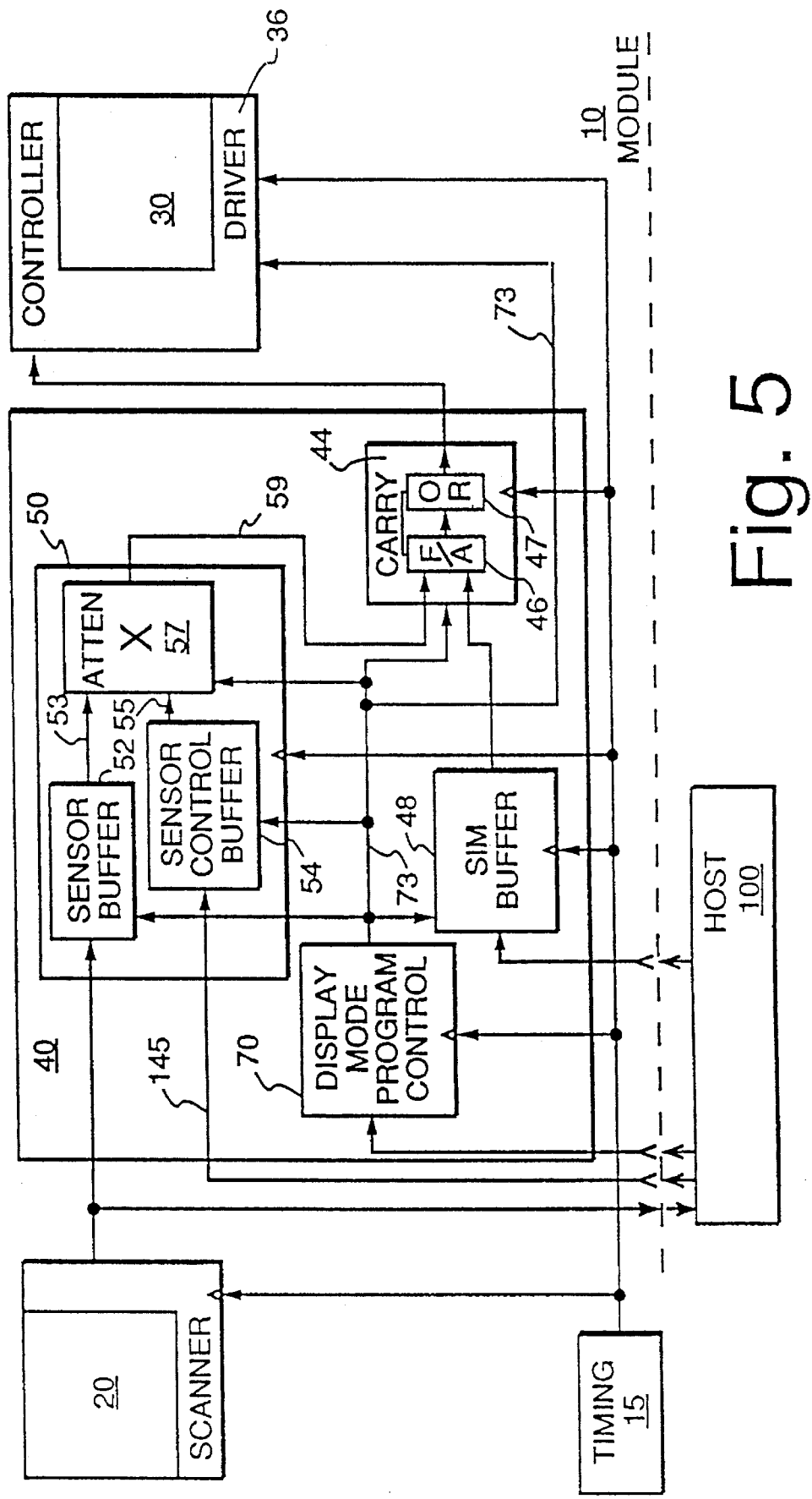
FIG. 5 shows an embodiment with processor means for attenuating multi-bit grey level pixel-signals.

As shown in FIG. 5, grey level video signals can be processed preferably using physical image control means 50 including a sensor control signal buffer 54 which receives line 145 sensor control signals for attenuation of corresponding sensor video pixels, and including an attenuator (preferably a multiplier) 57.

Grey level special cases are sensor-OFF or fully attenuated and sensor-ON or not attenuated. A sensor-OFF attenuation factor of 0 or sensor-ON factor of 1 as needed is provided to multiplier 57. For example, in one embodiment attenuation factors are applied to a divider (not shown) which divides the attenuation factor by a stored resolution value to produce a normalized attenuation factor.

A host 100 may input grey level attenuation factors having fractional intermediate values between binary 0001 and 1110 for 4 bit, or 11111110 for 8 bit, pixel representations.

From the sensor signal buffer 52, sensor pixel signals and attenuation factor signals are applied together to multiplier 57 to produce attenuated sensor signals on the physical image control line 59 to summation circuit 44.

A host means 100 provides simulation video pixel signals to simulation signal buffer 48, which are forwarded to summation circuit 44.

The summation circuit 44 preferably comprises a full adder (F/A) 46 and an OR gate battery 47 for each simulation video signal. The F/A carry bit is OR'ed with the sum value so that any potential overflows are counted as maximum values.

Display mode program control 70 (FIG. 5) stores the (4, 8 etc. bit) value of pixel representations to be passed on line 73 to physical image controller 50, simulation signal buffer 48, summation circuit 44 and display 30.

Figure 6:
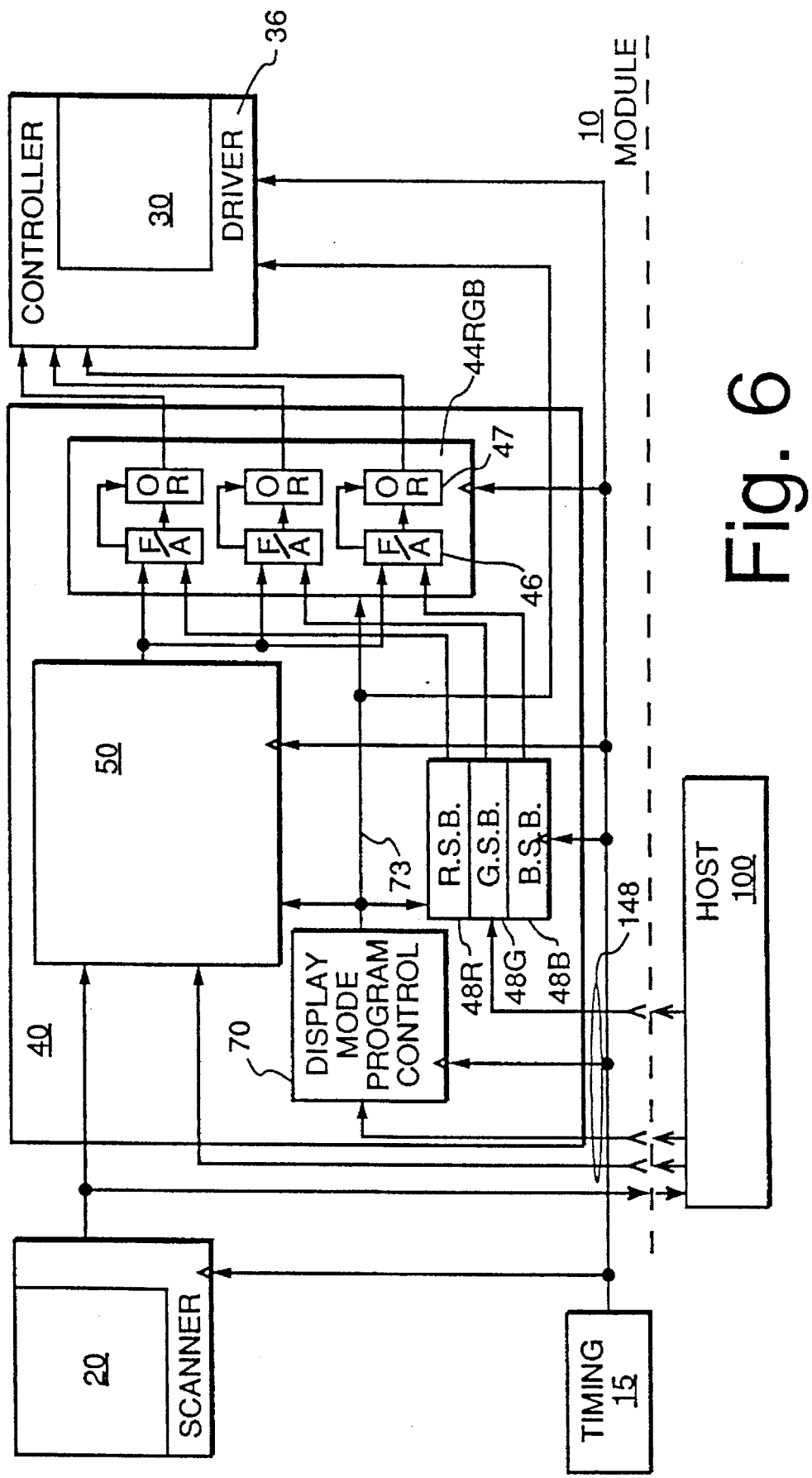
FIG. 6 shows an RGB color embodiment.

FIG. 6 shows the processor 40 in a color embodiment which includes simulation signal buffers 48R, 48G, 48B for each of the three (red, green and blue (RGB)) primary colors, respectively. The summation circuit 44RGB includes respective full adders 46 and OR gate batteries 47 for each of the three primary colors. An external host. 100 provides three color simulation signals through corresponding buffers 48RGB to be applied with grey or comparable RGB PIC 50 output signals to the summation means 44.

Module 10 may have functional modes configured either locally or remotely. Further modes could be power-up diagnostics and functional mode and resolution configuration download.

A configuration buffer 70 would receive module configuration values such as the resolution of bits to represent pixels. A host 100 could also dynamically configure a module 10.

Figure 7:
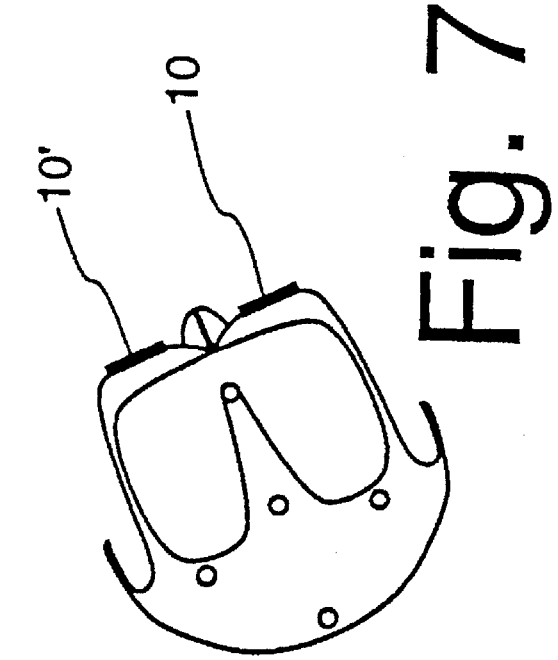
FIG. 7 shows a binocular embodiment of the invention.

FIG. 7 shows a binocular 3D embodiment combining a pair of modules 10 according to the invention, and supported by graphic display techniques as are well known in the art.

U.S. Pat. No. 4,807,202 is incorporated by reference for teaching means of tracking a module in a given physical environment. The module and the host may communicate via a direct hardwired or wireless link.

Although the invention is described in terms of several preferred embodiments, it will be appreciated by those skilled in the art that these embodiments could be modified without departing from the essence of the invention. It is therefore intended that the following claims be interpreted as covering any modifications falling within the true spirit and scope of the invention.

What is claimed is:

1. Video module means comprising:

video sensor means having an image field of pixel elements responsive to incident light to generate sensor video signals, a sensor video signal output terminal, and a timing signal terminal;

processor means having a sensor video signal input terminal coupled to said output terminal, a host signal input terminal for accepting a host signal, a timing signal terminal, video pixel signal combining means responsive to said sensor video signal and said host signals simultaneously to develop display video signals where each of said pixel elements is individually manipulated and controlled, and a display video signal output terminal for outputting said display video signals;

video display means having thin screen means disposed substantially on an axis in the center of and perpendicular to said image field and facing oppositely from said image field, a display video signal input terminal, and a timing signal terminal, wherein said video display means receives display video signals for said screen means to display video images; and timer means having a timing signal terminal for providing timing signals.

2. Video module means as recited in claim 1 wherein said video pixel signal combining means is: for SUMming said host signals and a function of said sensor video signals, to develop said display video signals.

3. Video module means as recited in claim 1 and further comprising mounting means for positioning said module means so that said optical axis is co-axial with a line of sight;

and wherein said sensor means and display means each includes a respective focussing means, the display focussing means being focusable so that displayed images are focussed onto virtual images which, to an observer viewing along the line of sight toward said screen means, appear the same size that images sensed by said sensor means would appear if seen by the observer from the same viewpoint without said module means.

4. Video module means as recited in claim 3 and wherein virtual images appear to be in a virtual image plane located at the same distance as the sensor focussing means focal plane from the observer.

5. Video module means as recited in claim 1 wherein said combining means comprises:

physical image control means including sensor video signal buffer means;

simulation video signal buffer means; and summation circuit means, wherein said host signals include simulation video signals, and sensor control signals which control said combining means to SUM said simulation video signals and said sensor video signals to develop said display video signals.

6. Video module means as recited in claim 5 wherein said host signals further include display mode program control signals;

said physical image control means further includes sensor control signal buffer means for applying said sensor control signals; and said combining means further comprises display mode program control means responsive to said display mode program control signals for configuring the operational mode and resolution of said module.

7. Video module means as recited in claim 5 wherein video input signals are SUMmed in a transparent overlay to develop said display video signals.

8. Video module means as recited in claim 5 and further comprising host means for providing said host signals.

9. Video module means as recited in claim 8 and further comprising means for wirelessly communicating said sensor and host signals between said module means and said host means.

10. Video module means as recited in claim 8 wherein sensor video signals are processed by said host means to provide said simulation video signals.

11. Video module means as recited in claim 8 wherein said host means includes pattern recognition means for inspecting said sensor video signals to recognize features that may be imaged from a physical environment and, in response, to develop said display video signals.

12. Video module means as recited in claim 8 and further comprising second module means and binocular mounting means for displaying views in three dimensions.

13. Video module means as recited in claim 8 wherein said module means comprises tracking means for determining the position of said module relative to its physical environment.

14. Video module means as recited in claim 13 wherein said host means can track positions of said module in said physical environment.

* * * * *